(12) United States Patent
Fransis

(10) Patent No.: US 11,996,386 B2
(45) Date of Patent: May 28, 2024

(54) SYSTEM-IN-PACKAGE ARCHITECTURE PROTECTION AGAINST PHYSICAL AND SIDE-CHANNEL ATTACKS

(71) Applicant: Applied Materials, Inc., Santa Clara, CA (US)

(72) Inventor: Bert Fransis, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 451 days.

(21) Appl. No.: 17/321,475

(22) Filed: May 16, 2021

(65) Prior Publication Data

US 2022/0366091 A1 Nov. 17, 2022

(51) Int. Cl.
*H01L 25/065* (2023.01)
*G06F 21/72* (2013.01)
*H01L 23/36* (2006.01)
*H01L 23/538* (2006.01)
*H01L 23/552* (2006.01)

(52) U.S. Cl.
CPC .......... *H01L 25/0652* (2013.01); *H01L 23/36* (2013.01); *H01L 23/5384* (2013.01); *H01L 23/552* (2013.01); *G06F 21/72* (2013.01)

(58) Field of Classification Search
CPC . H01L 25/0652; H01L 23/36; H01L 23/5384; H01L 23/552; G06F 21/72; G06F 21/556; H04L 9/003; H04L 9/0662
See application file for complete search history.

(56) References Cited

U.S. PATENT DOCUMENTS

| | | | |
|---|---|---|---|
| 2015/0121086 A1* | 4/2015 | Smith | G06F 21/556 713/189 |
| 2017/0094791 A1* | 3/2017 | Enriquez Shibayama | H05K 1/141 |
| 2021/0084747 A1* | 3/2021 | Schrems | H05K 1/18 |

* cited by examiner

*Primary Examiner* — Daniel D Chang
(74) *Attorney, Agent, or Firm* — Kilpatrick Townsend & Stockton LLP

(57) ABSTRACT

To protect against physical and side-channel attacks, circuit assemblies may mount a main processor opposite of a cryptographic processor such that traces between the two processors are hidden in a substrate. Another substrate defining a cavity may be mounted on the bottom of the substrate to enclose the cryptographic processor and prevent physical access without disrupting the cryptographic operations. Voltage converters with integrated inductors may also be included in the cavity to generate electromagnetic noise that will disrupt the sensitive equipment used in side-channel attacks. An electromagnetic shield may be sputtered on top of the main processor to block electromagnetic sniffing attacks while still allowing the processor to be coupled with a heat sink.

18 Claims, 9 Drawing Sheets

SYSTEM-IN-PACKAGE ARCHITECTURE PROTECTION AGAINST PHYSICAL AND SIDE-CHANNEL ATTACKS

TECHNICAL FIELD

This disclosure generally relates to methods and architectures for circuit assemblies that provide protection against physical and side-channel attacks. More specifically, this disclosure describes mounting techniques for main processors and cryptographic processors within a circuit assembly to protect the transmission of cryptographic keys and minimize exposure of operating characteristics.

BACKGROUND

The security of computing operations performed on edge devices represents a growing area of concern as advanced computer processors and algorithms are distributed on remote devices. For example, many Internet of Things (IoT) devices are now being distributed throughout the home and workplace environments that use advanced machine learning and/or artificial intelligence algorithms during operation. The operations performed on these distributed devices may often include secret information that should be kept secret from intrusive hackers. However, as these devices are deployed, they become susceptible to many different types of invasive attacks. Because the processors on these devices execute in uncontrolled environments, the cryptographic keys, encrypted information, and/or other secure information may be compromised.

SUMMARY

In some embodiments, a circuit assembly may include a first substrate including a first side and a second side opposite of the second side, and a first processor mounted on the second side of the first substrate. The first processor may be configurable to generate cryptographic keys used by a cryptographic operations. The circuit assembly may also include a second processor mounted on the first side of the first substrate opposite of the first processor, where the second processor may be configurable to perform the cryptographic operations. The first substrate may include traces through an interior of the first substrate between the first processor and the second processor through which the cryptographic keys may be transmittable from the first processor to the second processor.

In some embodiments, a circuit assembly may include a first substrate including a first side and a second side opposite of the first side, and a second substrate including a first side and a second side opposite of the first side, where the first side of the second substrate may be mounted to the second side of the first substrate, and the second substrate may include a cavity. The circuit assembly may also include a first processor that is configurable to generate cryptographic keys, where the first processor may be mounted to the second side of the first substrate inside of the cavity of the second substrate.

In some embodiments, a method of assembling a circuit assembly may include mounting a first substrate including a first side and a second side opposite of the first side to a second substrate including a first side and a second side opposite of the first side. The first side of the second substrate may be mounted to the second side of the first substrate, and the second substrate may include a cavity. The method may also include mounting a first processor to the second side of the first substrate inside of the cavity of the second substrate.

In any embodiments, any and all of the following features may be implemented in any combination and without limitation. The traces through the interior of the first substrate may not be exposed on the first side or the second side of the first substrate when the first processor and the second processor are mounted on the first substrate. The first processor may be mounted to the first substrate using a ball grid array (BGA) surface-mount packaging. The circuit assembly may also include a voltage converter mounted on the second side of the first substrate, where the voltage converter may provide a regulated voltage to the first processor. The circuit assembly may also include a memory chip mounted on the first side of the first substrate, wherein the first processor may be configured to perform the cryptographic operations using the cryptographic keys on data that is stored in the memory chip. The circuit assembly may also include a layer of metal shielding that is sputtered onto the first side of the first substrate to cover the first processor with the layer of metal shielding. The circuit assembly may also include a heatsink that is mounted on the first processor such that the layer of metal shielding may be between the first processor and the heatsink. The circuit assembly may also include a second processor mounted to the first side of the first substrate, wherein the second processor may be configurable to receive the cryptographic keys from the first processor and perform cryptographic operations. The circuit assembly may also include a third substrate that may be mounted to the second side of the second substrate such that the first substrate and the third substrate enclose the first processor within the cavity of the second substrate. The first substrate may include a higher density interconnect than the second substrate. The circuit assembly may also include a voltage converter that is mounted to the second side of the first substrate with the first processor inside of the cavity of the second substrate. The voltage converter may include an integrated converter and inductor in an integrated circuit package. The integrated converter may generate electromagnetic noise within the cavity of the second substrate. The first substrate may be mounted to the second substrate using a ball grid array (BGA). Pads in the BGA may be unevenly spaced such that they prevent a linear access to the cavity between the first substrate and the second substrate. The method may also include mounting a second processor to the first side of the first substrate, where the first processor may be connected to the second processor through traces that are inaccessible without removing the second processor. The method may further include sputtering an electromagnetic shield on the second processor and at least a portion of the first side of the first substrate. The electromagnetic shield may include an adhesive layer, a metal layer, and a conformal coating.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
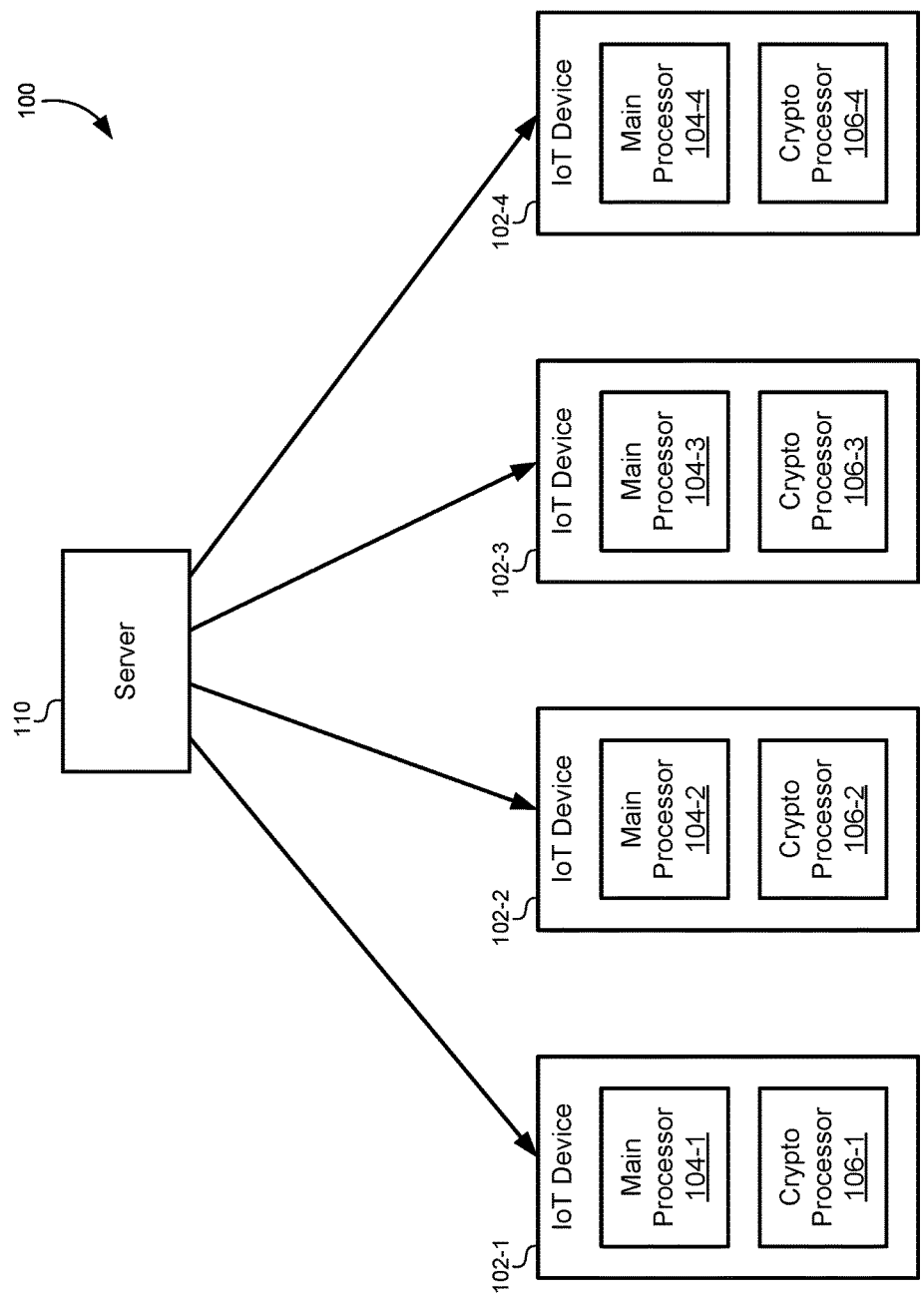
FIG. 1 illustrates a distributed system of devices that communicate with an edge server, according to some embodiments.

FIG. 1 illustrates a distributed system of devices 102 that communicate with an edge server 110, according to some embodiments. Although not shown explicitly, the edge server 110 may itself communicate with a datacenter in the cloud. The devices 102 may also directly communicate with the datacenter in the cloud. The edge server 110 may communicate with the devices 102 to receive updates, transmit software upgrades, receive diagnostic data, perform processing operations, and so forth. Each of the devices 102 may be distributed into different locations, such as homes, workplaces, vehicles, public sites, and/or any other location. In order to process data and perform various algorithmic operations, each of the devices 102 may include a main processor 104. The main processor 104 may include any type of processor, such as an ARM processor.

While this distributed system allows the devices 102 to perform complex calculations and to store and utilize collected data, this also leaves the devices 102 vulnerable to various types of attacks. Specifically, malicious actors may attempt to compromise the operations performed by the processor 104 and/or gain access to secret data stored on the devices 102. Malicious actors may simply want to disrupt the IoT cloud service provider by shutting down the devices 102 to demand a ransom be paid. These attacks may target data as it is transmitted back-and-forth between the devices 102 and the server 110. Other attacks may target the server 110 specifically. However, the most vulnerable avenue for a hacker attack may be the devices themselves 102. Specifically, as the devices 102 are deployed to uncontrolled environments, hackers may have access to the physical hardware as it runs and performs cryptographic operations. Sophisticated attacks have been developed to compromise even the most secure processors and encryption techniques.

For example, many IoT devices may use security protection systems that are built into the processor die. One example system may include the ARM TrustZone approach to secure operations on a processor. Other processors may use similar secure zone techniques that provide a system-wide approach to embedded security. These secure zones in processors represent an embedded security technology that starts at the hardware level by creating multiple environments that can simultaneously run on a single core. One of these environments may be a secure environment, while other environments may be less secure. Because the secure environments begin at the physical layer of the processor, the secure zone can execute, for example, a secure operating system and a normal operating system simultaneously on the same core. Non-secure software is blocked from access to the secure environment and the resources that are available therein. Cryptographic operations may be performed on the main processor in the secure zone.

Despite the improved security provided by such secure zone processing, these operations may still rely on external hardware solutions, such as a cryptographic processor 106. An example of a cryptographic processor may include a Trusted Platform Module (TPM), which may include dedicated microprocessors or microcontrollers designed to secure hardware through integrated cryptographic keys. A cryptographic processor 106 may include hardware random number generators and algorithms that generate cryptographic keys that may be used for the cryptographic operations performed by the main processor 104. The cryptographic processor 106 may perform other operations, such as remote attestation and other trusted computing functions. However, the cryptographic processor 106 will often have less computing power than the main processor 104 with which it may be paired. Therefore, instead performing the cryptographic operations using the cryptographic keys generated by the cryptographic processor 106, the cryptographic processor 106 may transmit the cryptographic keys to the main processor 104 such that the main processor 104 may perform the cryptographic operations using the cryptographic keys.

This communication of cryptographic keys between the main processor 104 and the cryptographic processor 106 becomes a vulnerability that may be exploitable by a physical attack to break the secure enclave provided by the main processor 100, which may in turn allow a hacker to take over the systems and cloud interactions between the device 102 and the server 110. Moreover, these same secure systems built into the main processor 104 often do not have active circuit protection to detect and mitigate physical intrusion. The main processor 104 may not often include active circuitry that is added to harden the system against side-channel attacks, such as Simple Power Analysis (SPA), Differential Power Analysis (DPA), electromagnetic attacks, and so forth.

Figure 2:
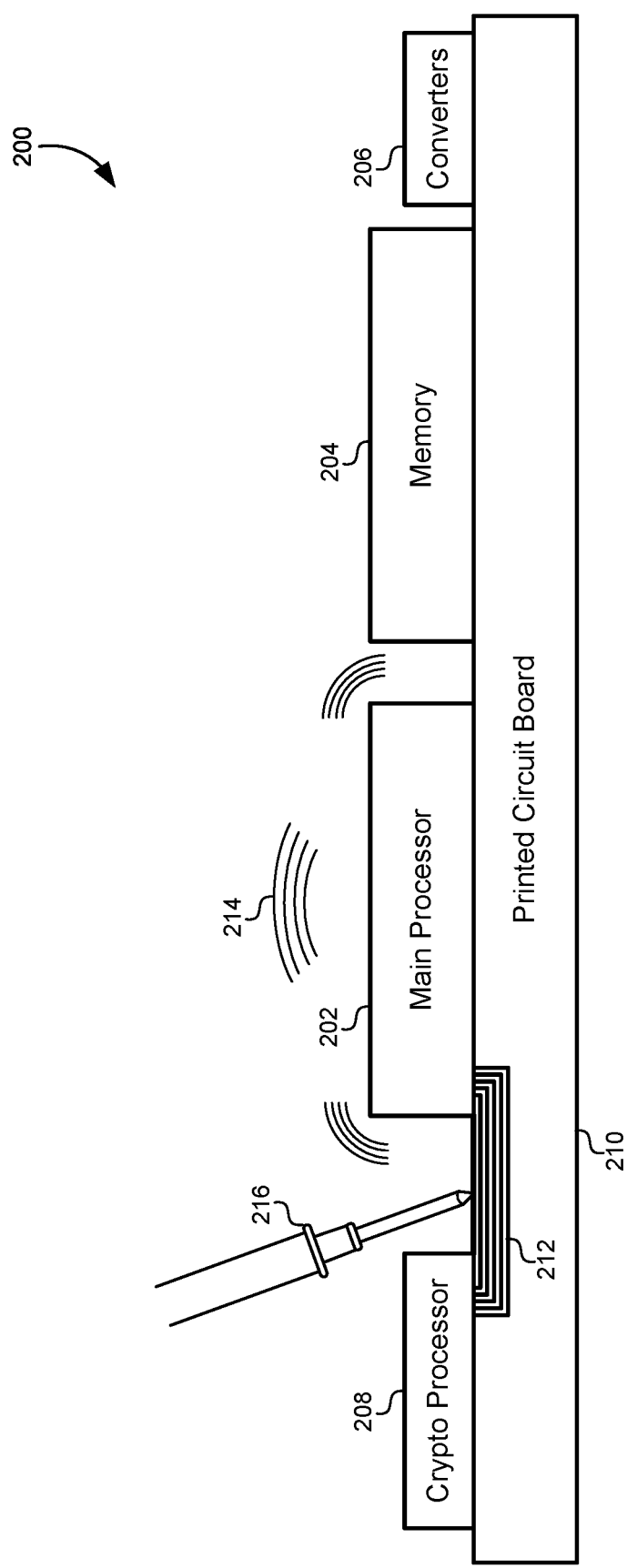
FIG. 2 illustrates a circuit assembly with a cryptographic processor and a main processor that are vulnerable to physical attacks, according to some embodiments.

FIG. 2 illustrates a circuit assembly 200 with a cryptographic processor 208 and a main processor 202 that are vulnerable to physical and/or side-channel attacks, according to some embodiments. The circuit assembly 200 may include a substrate 210. The substrate 210 may be a printed circuit board, a silicon substrate, an interposer layer, and/or any other type of substrate upon which integrated circuits can be mounted. The substrate 210 may include a first side upon which the components illustrated in FIG. 2 are mounted. These components may include a cryptographic processor 208, a main processor 202, a memory 204, and/or one or more power management devices 206, such as DC-DC voltage converters and low drop-out (LDO) regulators.

In order to perform a cryptographic operation, the main processor 202 may retrieve cryptographic keys that are generated by the cryptographic processor 208. The cryptographic processor 208 may transmit the cryptographic keys to the main processor 202 through traces 212 that run between the cryptographic processor and the main processor 202 through the substrate 210. As illustrated in FIG. 2, these traces may be exposed and/or otherwise vulnerable to a physical attack. For example, traces that are on a surface level of the substrate 210 may be probed using a voltage probe 216. For traces that run on internal layers of the substrate 210, a skilled attacker may carefully remove portions of the substrate 210 to expose these traces. Because the traces run between the cryptographic processor 208 and the main processor 202, they are vulnerable to such an attack.

Additionally, the main processor 202 may receive regulated voltages/currents from the power management devices 206, such as voltage converters/regulators 206. A probe 216 may be used to manipulate the voltage/current level received by the main processor 202 in order to induce a fault or glitch during the cryptographic operation on processor 202 (e.g., a fault attack, like the "clock screw" attack on the ARM TrustZone). Alternatively, electromagnetic radiation 214 from the main processor 202 may be "sniffed" outside of the package using EM sensing equipment. This may be combined with measurements of a clock frequency used by the main processor 202 to initiate sophisticated side-channel attacks on the main processor 202. Specifically, these attacks can gain access to cryptographic keys or can bypass some of the safety measures altogether during a secure boot used by the main processor 202 and/or gain access to trusted operating environments in the main processor 202. Cryptographic keys can be extracted that are used for memory encryption, and the entire trust zone of the main processor 302 can be bypassed. This may result in malicious activities such as cloud network access, AI data falsification, stealing of proprietary AI algorithms, and so forth.

Note that these vulnerabilities exist despite the trusted zone that may operate on the main processor 202. These vulnerabilities also exist despite the Trusted Platform Module (TPM) technology used by the cryptographic processor 208. Generally, TPM chips may include multiple physical security mechanisms to make them tamper resistant. However, because the cryptographic processor typically has a low compute bandwidth for cryptographic operations like encrypting data to store in the memory 204, the cryptographic keys are usually transmitted to the main processor 202 to perform the cryptographic operations to be executed in the trusted zone of the main processor 202. This results in two main vulnerabilities in the circuit assembly 200. Namely, (1) the unsecured trace interface between the cryptographic processor 208 and the main processor 202, and (2) the vulnerability of the main processor 202 to side-channel attacks based on measuring electromagnetic radiation from the cryptographic processor 208 to reveal the cryptographic keys, or using fault-inducing attacks, such as interfering with the regulated voltages from the converters 206 to induce system glitches during cryptographic operations.

The circuit assemblies and methods described herein address these security concerns of physical and side channel attacks against the secure operations performed by the main processor 104 and the cryptographic processor 106. Specifically, these embodiments provide a way to enhance the security level of protection against physical and side-channel attacks against systems using a main processor and a cryptographic processor. These embodiments are particularly useful for processors that do not include integrated on-chip physical protection circuitry, such as tamper and intrusion detection, or power consumption balancing regardless of cryptographic compute loads.

Figure 3A:
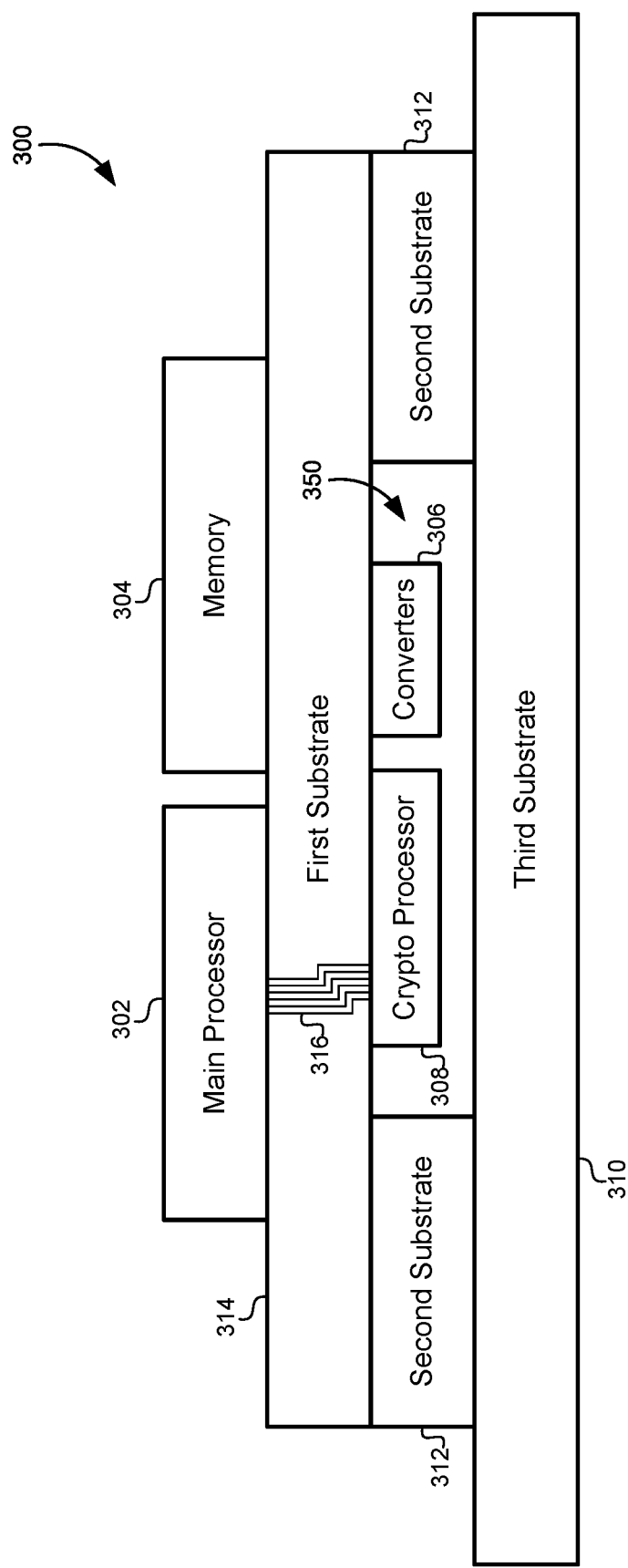
FIG. 3A illustrates a circuit assembly that includes a number of physical solutions to prevent physical and side-channel attacks on cryptographic operations, according to some embodiments.

FIG. 3A illustrates a circuit assembly 300 that includes a number of physical solutions to prevent physical and side-channel attacks on cryptographic operations, according to some embodiments. The circuit assembly 300 may be designed as a System in Package (SiP) that is packaged together to maintain physical security. The circuit assembly 300 may include a first substrate 314. The first substrate 314 may include any type of substrate, such as printed circuit boards, organic substrates, glass substrates, silicon substrates, interposer layers, and so forth. The first substrate 314 may include a first side (e.g., a top side) and a second side (e.g., a bottom side) that is opposite of the first side.

The circuit assembly 300 may include a main processor 302 and a cryptographic processor 308 as described above. The main processor 302 may also be referred to as a "second" processor, and the cryptographic processor 308 may alternatively be referred to as a "first" processor. The terms "first/second" are used merely to distinguish different processors from each other. These terms do not imply order, precedence, importance, operation, or any other characteristic of the processors. Instead of mounting the main processor 302 in the cryptographic processor 308 on the same side of the first substrate 314 as illustrated in FIG. 2, this circuit assembly 300 mounts the main processor 302 on the first side of the first substrate 314, while mounting the cryptographic processor 308 on the second side of the first substrate 314. In some embodiments, the main processor 302 and the cryptographic processor 308 may be mounted directly opposite of each other on the first substrate 314, such that at least a portion of the cryptographic processor 308 is directly below the main processor 302.

With the main processor 302 and the cryptographic processor 308 mounted on opposite sides of the first substrate 314, the traces 316 between the main processor 302 and the cryptographic processor 380 may pass through an interior of the first substrate 314. As illustrated in FIG. 3A, the traces 316 may be directly beneath the main processor 302 and/or directly above the cryptographic processor 308. This provides a level of physical protection for the traces 316 as they pass between the main processor 302 and the cryptographic processor 308 as they are inaccessible to a physical attack without destroying the package.

In some embodiments, the main processor 302 and/or the cryptographic processor 308 may be mounted to the first substrate 314 using surface mounting technologies where the connections for the main processor 302 are underneath the main processor 302 against the first substrate 314 without being exposed on the sides of the main processor 302 like traditional pin packages. For example, the main processor 302 and/or the cryptographic processor 308 may use BGA or direct mounting to the first substrate 314. This effectively hides the traces 316 in their entirety from outside access. The placement of the main processor 302 and/or the cryptographic processor 308 means that the traces 316 are not readily accessible on an exposed surface of the first substrate 314 as illustrated in FIG. 2.

In order to physically access the traces 316, an attacker would need to cut into the first substrate 316 and tunnel beneath the main processor 302. This would very likely damage other traces in the system and interfere with the functioning of the main processor 302. Such interference would disrupt the cryptographic operations and effectively prevent any side channel attacks against the main processor 302. In this configuration, the cryptographic keys generated by the cryptographic processor 308 are transmittable through the traces 316 to the main processor 302 with a reduced risk of being compromised during transmission.

Some embodiments may optionally add additional security features to the chip assembly 300. For example, some embodiments may add a second substrate 312. The second substrate 312 may include a first side (e.g., a top side) and a second side (e.g., a bottom side) opposite of the first side. The first side of the second substrate 312 may be mounted to the second side of the first substrate 314 as illustrated in FIG. 3A. The second substrate 312 may include a cavity 350 in a center portion of the second substrate 312. The cryptographic processor 308 may be mounted to the second side of the first substrate 314 inside of the cavity formed or defined by the second substrate 312. While FIG. 3A illustrates a side view of the second substrate 312, FIG. 3C discussed below illustrates a bottom view of the second substrate 312 that illustrates the cavity 350 in which the cryptographic processor 308 may be mounted.

Note that the addition of the second substrate 312 is optional. Some embodiments may rely on burying the traces 316 within the first substrate 314 without requiring the cavity provided by the second substrate 312.

The cavity 350 may have any shape, and may be located anywhere on the second substrate 312. In these examples, the cavity 350 is located in a center portion of the second substrate 312 and may have a square shape. This may be ideal in some embodiments to maximize the area of the second substrate 312 between the edge of the second substrate 312 and the cavity 350. In other words, this may maximize the distance through which an attacker must penetrate the second substrate 312 to gain access to the cryptographic processor 308. The size of the cavity 350 may be minimized such that it is only slightly larger (e.g., 5 mm) in dimension than the components mounted inside of the cavity 350.

Optionally, some embodiments may include a third substrate 310 in the circuit assembly 300. The third substrate may be mounted directly to the second substrate 312. Once combined, the first substrate 314, the second substrate 312, and the third substrate 310 may completely enclose the cryptographic processor 308 within the cavity 350. The first substrate 314, second substrate 312, and third substrate 310 may be mounted to each other using BGA connections and/or other surface mount connections that do not expose these connections to the edges of the substrates. In order to gain physical access to the traces 316 or the cryptographic processor 308 or the power management devices, an attacker would have to physically penetrate one of these substrates 314, 312, 310. This would involve destroying the substrate materials or disassembling the substrates, and such an intrusive action would cause an operational failure, thus nullifying the attack because the device would no longer be operational.

These embodiments may be particularly useful for vision processing operations that use artificial intelligence (AI) neural networks. For example, the main processor 302 may be a vision processing unit (VPU), and the memory 304 may be implemented using a low-power double data rate (LPDDR) DRAM memory that stores the weights for the neural network. The first substrate 314 may be overmolded to provide added security by making vulnerable interconnects between the VPU in the DRAM not directly probable by a physical attacker. The traces between the VPU and the LPDDR may be buried internally inside the first substrate 314 such that they are not exposed on the surface of the first substrate 314.

Figure 3B:
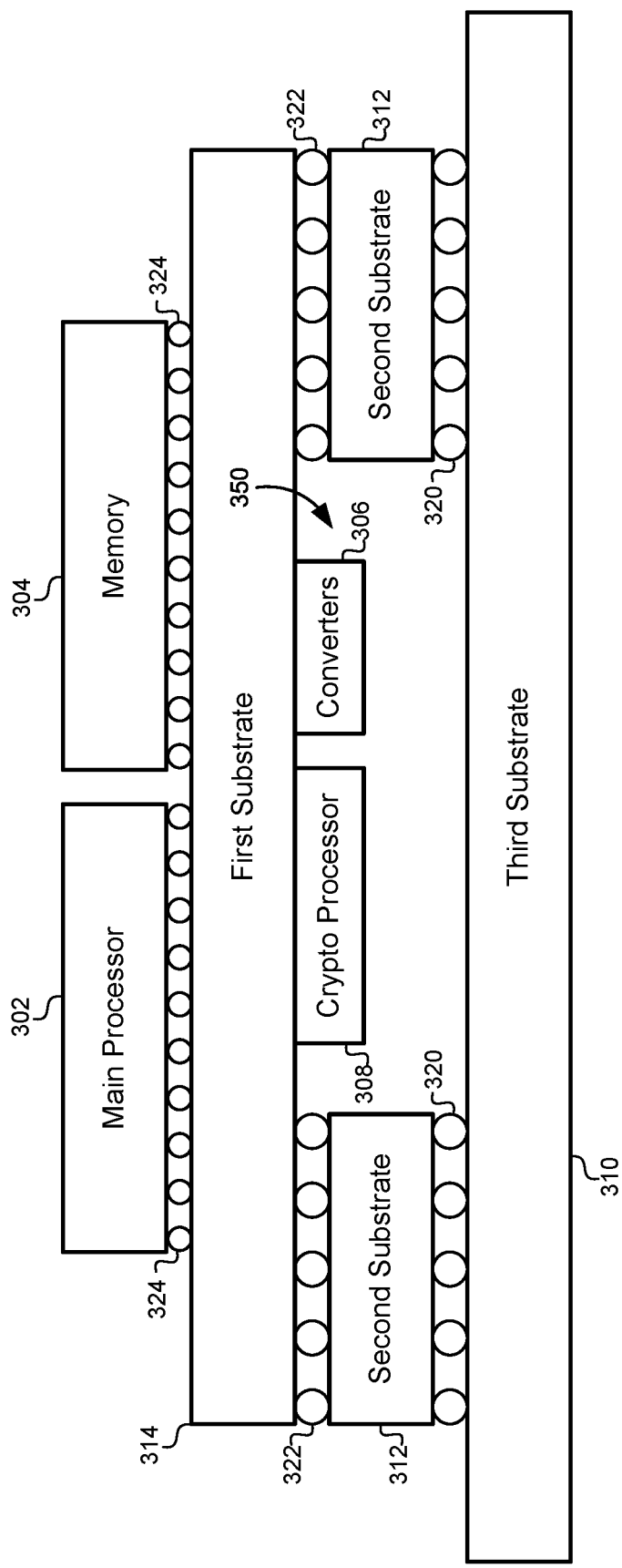
FIG. 3B illustrates a comparison of the interconnect density between the first substrate and the second substrate, according to some embodiments.

FIG. 3B illustrates a comparison of the interconnect density between the first substrate 314 and the second substrate 312, according to some embodiments. In this example, the first substrate 314 may be an organic substrate with a relatively high interconnect density. For example, the main processor 302 and/or the memory 304 may include a fine-pitch BGA pattern 324 that uses a high interconnect density. Similarly, the cryptographic processor 308 and/or the voltage converters 306 may also include a fine-pitch BGA pattern and/or be directly mounted to the first substrate 314. However, the first substrate 314 can transition the high density interconnect into a relatively low density interconnect when passing these signals between the first substrate 314 and the second substrate 312.

For example, a BGA pattern 322 between the first substrate 314 and the second substrate 312 may have a lower density than the BGA pattern 324 between the main processor 302 and the first substrate 314. Similarly, the same low-density BGA pattern 320 may be used between the second substrate 312 and the third substrate 310. Therefore, the interconnect density within the second substrate 312 may be lower than the interconnect density of the first substrate 314. Similarly, the interconnect density within the third substrate 310 may be lower than the interconnect density of the first substrate 314. The second substrate 312 can be manufactured out of a less-expensive material with greater tolerances because the interconnect density is less than that of the first substrate 314. Thus, the second substrate 312 may act as an interface between the third substrate 310 (or another connection with external system) and the high-density interconnect of the main processor 302.

Figure 3C:
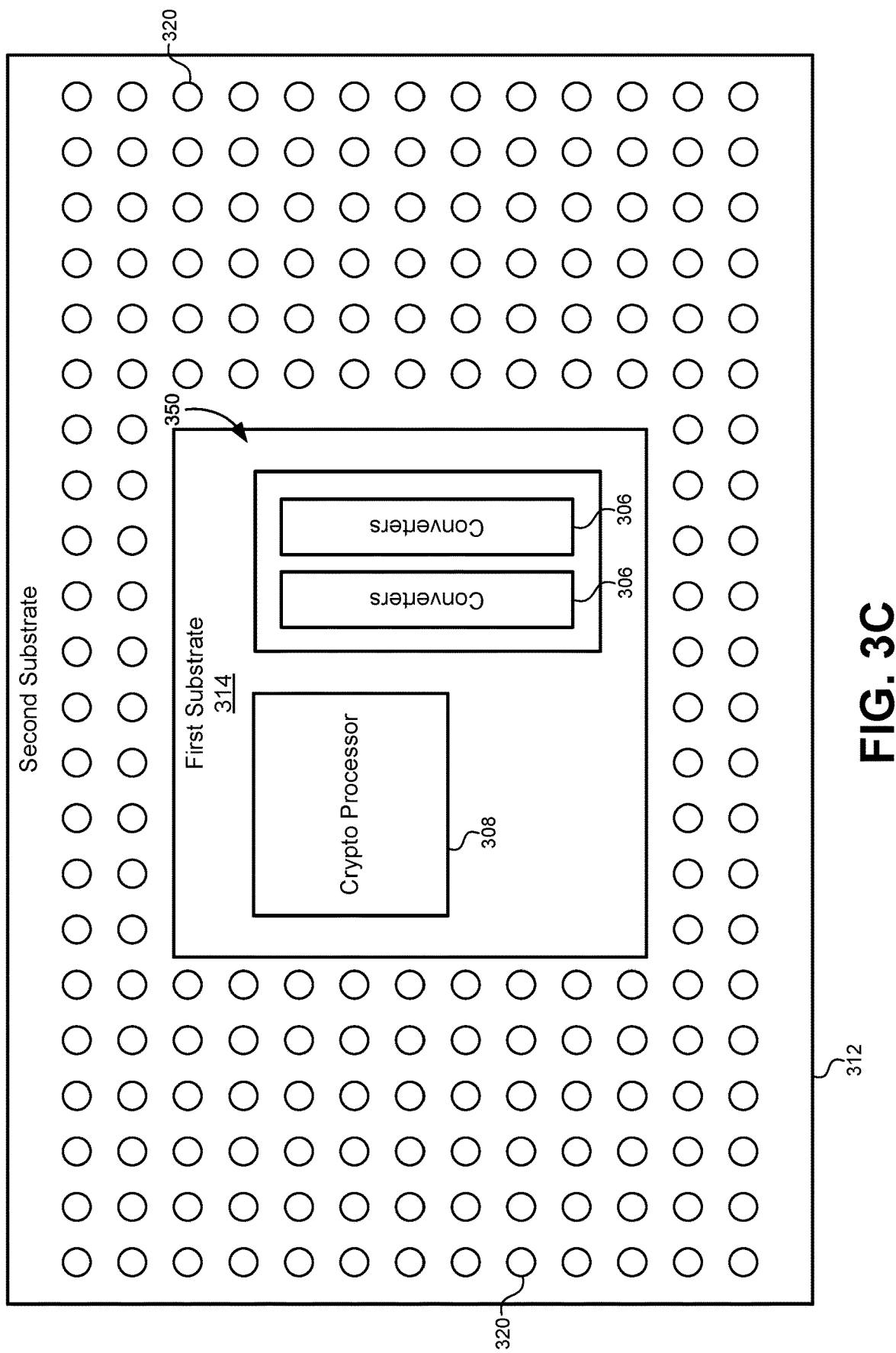
FIG. 3C illustrates a bottom view of the cavity created by the second substrate, according to some embodiments.

FIG. 3C illustrates a bottom view of the cavity 350 created by the second substrate 312, according to some embodiments. In this example, the BGA pattern 320 is a regularly spaced grid pattern laid out in regular rows and columns. In some alternative embodiments, the BGA pattern 320 may be irregularly spaced with rows and columns that are offset from each other. This may further prevent any attempts to tunnel through the second substrate 312 into the cavity 350.

Optionally, some embodiments may also place any voltage converters 306 (e.g., DC/DC converters, switching regulators, etc.) that provide regulated power to the main processor 302 and/or cryptographic processor 308 inside the cavity 350 with the cryptographic processor 308. As described above, some side-channel attacks may rely on physically manipulating the system voltages provided by the voltage convertors (i.e., fault inducing attacks) by gaining access to the voltage used by the main processor 302. Placing one or more converters 306 that provide system power to the main processor 302 and other components in the chip assembly 300 inside the cavity 300 may shield the converters and the traces from the converters from external access. Specifically, the traces between the converter 306 and the main processor 302 may be buried inside the internal portion of the first substrate 314 such that they are not readily accessible from the outside.

Additional optional security features may enhance the protection provided by the cavity 350. For example, some embodiments may use an integrated voltage regulator chip (IVR). An IVR may integrate the converter and an accompanying inductor into the same integrated circuit package. Additionally, switching regulars may be used as the converters 306 with a relatively high switching frequency that is, for example, greater than approximately 100 MHz. The IVRs running at this much higher clock frequency are able to integrate the inductors on the IVR die for integration within a single package. This also allows the IVR(s) to be placed within the cavity 350 with the cryptographic processor 308. Although typical converters operate around 1 MHz, operating the switching regulators of the IVR with the integrated inductors at a higher frequency may generate frequency harmonics and a large amount of electromagnetic noise that will be amplified and reflected in the cavity 350. Essentially, these high frequency switching IVRs may create large electromagnetic fields that then radiate out of the circuit assembly 300 to "swamp" or overload sensitive electromagnetic sensing circuits used by hackers to detect the EM fields from the cryptographic operations. This noise may therefore further shield the operation of the converters 306 and/or the main processor 302.

Consider the recently discovered "clock screw" (CLK-SCREW) attack. The CLKSCREW attack can gain access to encrypted secrets on the main processor 302 by virtue of accessing the system voltage and the clock frequency of the main processor 302. Specifically, the main processor may use dynamic voltage and frequency scaling (DVFS) to adjust the operating voltage and clock frequency used by the main processor during cryptographic operations. The CLK-SCREW attack monitors or sniffs these voltages/frequencies to gain access to the secret data on the main processor 302. However, the solution described above which places the converters 306 within the cavity 350 and generates frequency harmonics and a large amount of electromagnetic noise may effectively obscure the operating voltage changes from external access, thereby preventing access to one of the necessary components of the CLKSCREW attack.

Figure 4:
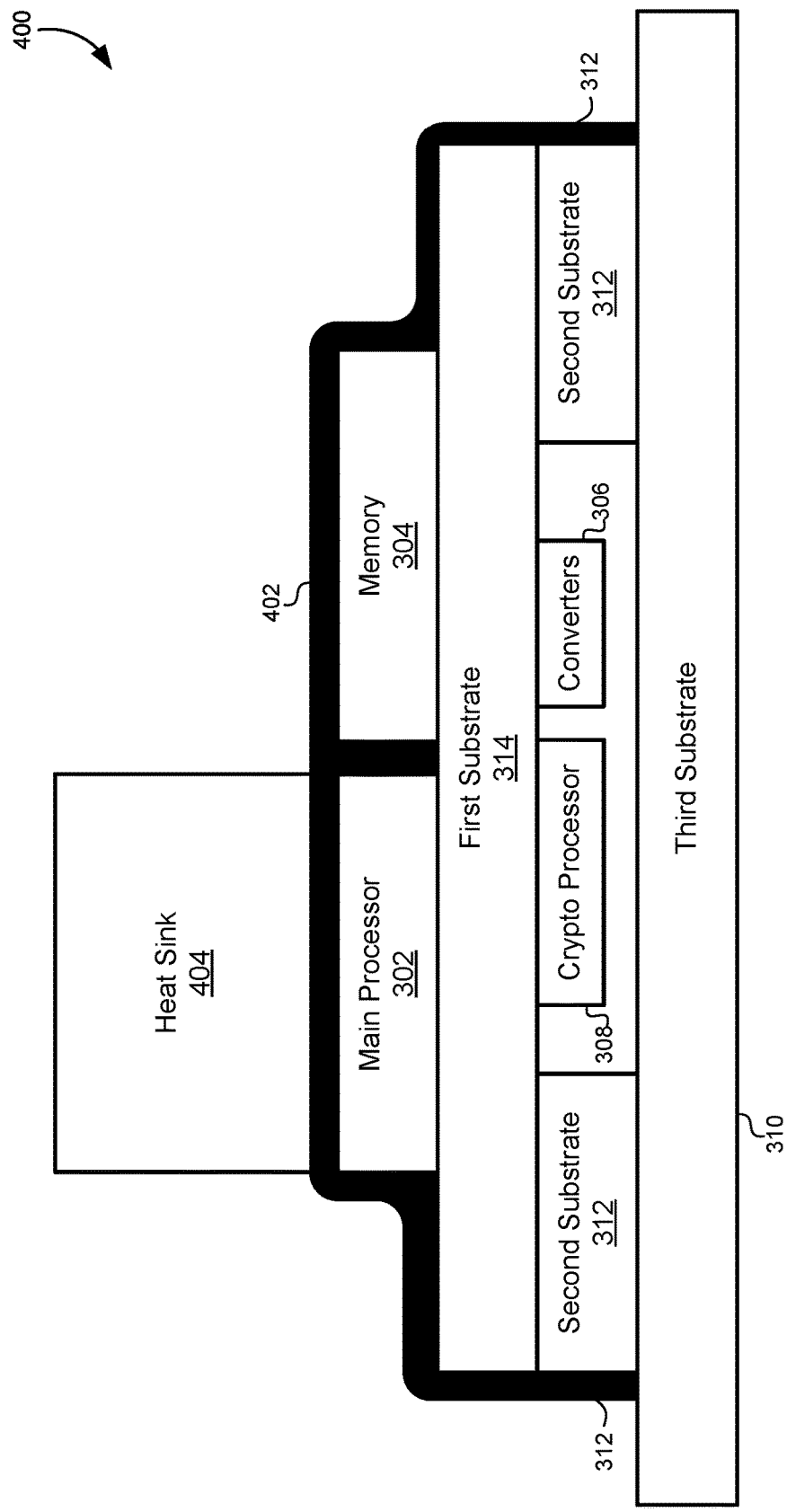
FIG. 4 illustrates an optional sputtered shield that may be applied over the main processor, according to some embodiments.

FIG. 4 illustrates an optional sputtered shield that may be applied over the main processor 302, according to some embodiments. In addition to the features described above, some embodiments may optionally apply a layer of electromagnetic interference (EMI) shielding 402 to cover at least the main processor 302. The EMI shielding 402 may be sputtered as one or more layers of material on top of the main processor 302 along with any other components mounted to the first side of the first substrate 314. The EMI shielding 402 may also be sputtered beyond the first substrate to cover any exposed portions of the second substrate, and/or the third substrate as illustrated in FIG. 4. Some embodiments may only the first side of the first substrate 314 and the components mounted thereon. However, any configuration of the EMI shielding 402 that covers the main processor 402 is within the scope of this disclosure.

The EMI shielding 402 may be sputtered on individual components in the circuit assembly 400 to reduce electromagnetic leakage that may be sniffed by an attacker. In some embodiments, the EMI shielding 402 may be optimized to reduce electromagnetic leakage by more than 20 dB at frequencies of operation used by the cryptographic processor 308 and/or the main processor 302.

The composition of the EMI shielding 402 may include a number of different layers that are sputtered in succession on top of the components of the circuit assembly 400. For example, a first layer may be deposited as an adhesion layer that is between 200 nm and 300 nm thick. Next, EMI shielding using a metal material, such as Cu, may be deposited. The shielding layer may be approximately 3 μm to approximately 6 μm thick. Third, a cap layer approximately 200 nm to 300 nm thick may be applied to protect the shield from oxidation or damage. The cap layer may be a conformal coating or other protective material.

In some embodiments, a heatsink 404 may be attached for the main processor 302 on top of the EMI shielding 402. Instead of attaching the heatsink 404 directly to the main processor 302, the heatsink 404 may be applied directly to the EMI shielding 402 after the EMI shielding has been applied to the main processor 302. Because the sputtering process can apply a very thin layer of EMI shielding 402, the heatsink 404 can effectively couple heat away from the main processor 302 through the EMI shielding 402.

Although EMI shielding can be to shield electronic components from outside electromagnetic interference, the embodiments described herein are unique in that they use the EMI shielding 402 to prevent electromagnetic emissions from the processor from being revealed to an outside malicious actor. For example, EMI shielding has been used to protect electronic components from outside radiation sources. However these embodiments apply the EMI shielding 402 in a way that prevents EM radiation from escaping electronic components inside the shielding.

Figure 5:
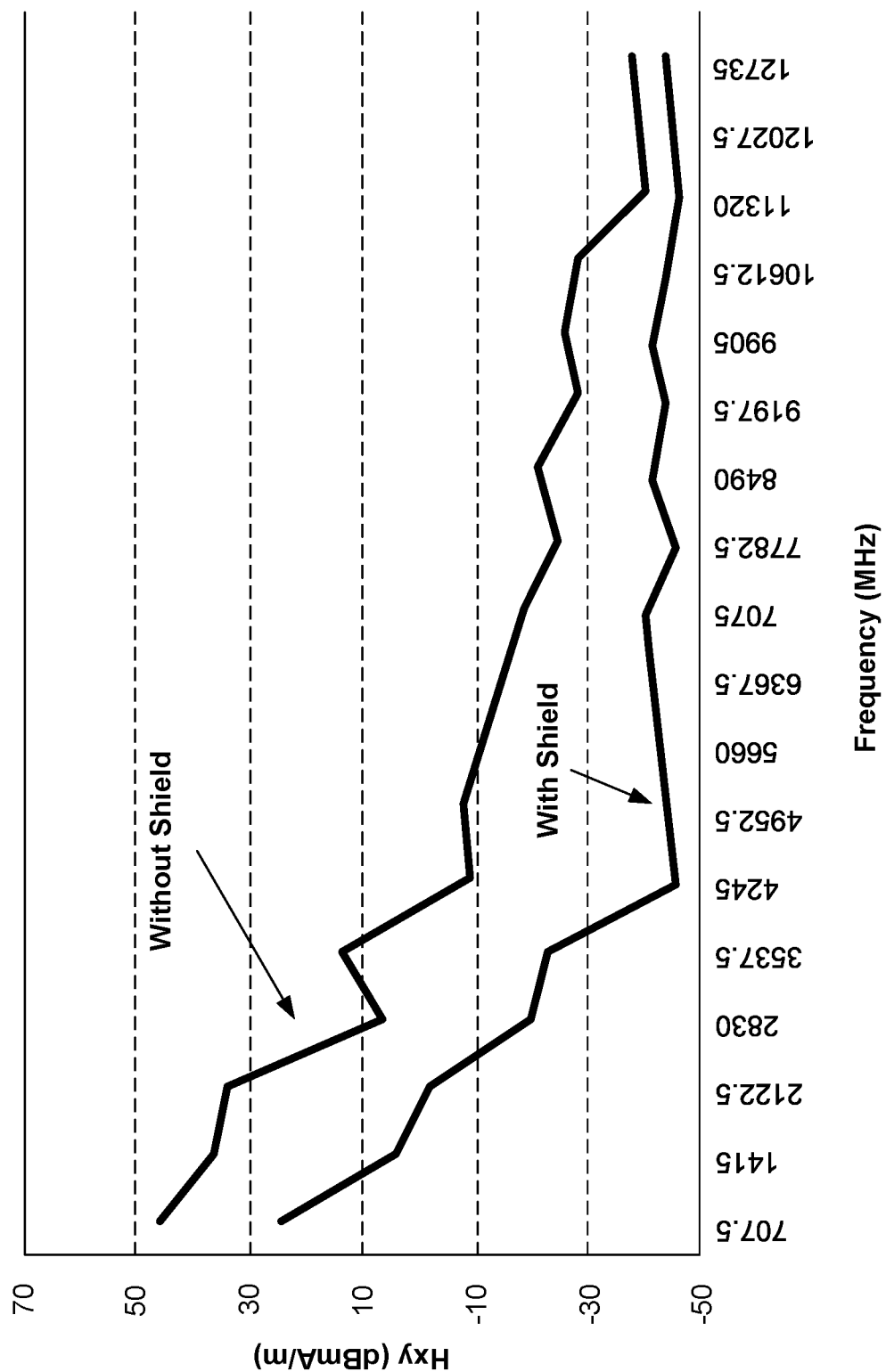
FIG. 5 illustrates a graph of the attenuation of electromagnetic signals as they are observed with the EMI shielding and without the EMI shielding, according to some embodiments.

FIG. 5 illustrates a graph of the attenuation of electromagnetic signals as they are observed with the EMI shielding 402 and without EMI shielding, according to some embodiments. Note that the signal attenuation due to the EMI shielding 402 increases as the frequency of the signal increases. Therefore, some embodiments may operate the main processor 302 and/or the cryptographic processor 308 at frequencies greater than 1 GHz. This level of attenuation provides protection against SEMA/DEMA side channel attacks on AES, SHA and ECC encryption/decryption operations.

Figure 6:
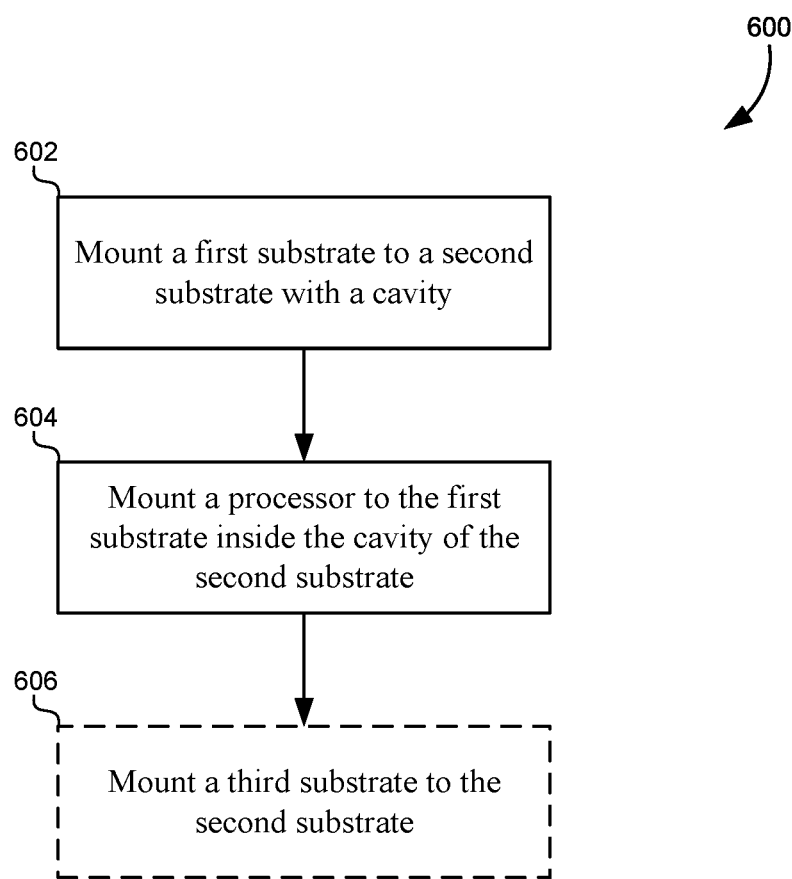
FIG. 6 illustrates a flowchart of a method of assembling a circuit assembly, according to some embodiments.

FIG. 6 illustrates a flowchart 600 of a method of assembling a circuit assembly, according to some embodiments. The method may include mounting a first substrate to a second substrate with a cavity (602). The first substrate may include a first side and a second side opposite of the first side. The second substrate may also include a first side and a second side opposite of the first side. The second side of the first substrate may be mounted to the first side of the second substrate. The second substrate may form a cavity inside of the second substrate. The first substrate may be mounted to the second substrate as depicted above in FIGS. 3A-3C.

The method may also include mounting a processor to the first substrate inside of the cavity formed by the second substrate (604). For example, the processor may be mounted to the second side of the first substrate. The processor may be a cryptographic processor configured to generate cryptographic keys for use in cryptographic operations. Optionally, the method may also include mounting a main processor to the first side of the first substrate. The main processor may be configured to perform the cryptographic operations using the cryptographic keys generated by the cryptographic processor. The main processor may be a referred to as a second processor, while the cryptographic processor may be referred to as a first processor. These processors may be mounted to the first substrate as depicted above in FIGS. 3A-3C.

Optionally, the method may also include mounting a third substrate to the second substrate (606). The third substrate and the first substrate may completely enclose the cavity formed by the second substrate. Optionally, voltage converters, such as integrated IVRs may also be mounted to the first substrate in the cavity formed by the second substrate. Optionally, EMI shielding may be sputtered or otherwise applied to the top of the first substrate to coat the main processor and/or other components on the first substrate. A heatsink may also be applied to the main processor on top of the EMI shielding if present. These optional features may be applied as depicted above in FIGS. 3A-3C and FIG. 4.

It should be appreciated that the specific steps illustrated in FIG. 6 provide particular methods of assembling a circuit assembly according to various embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 7:
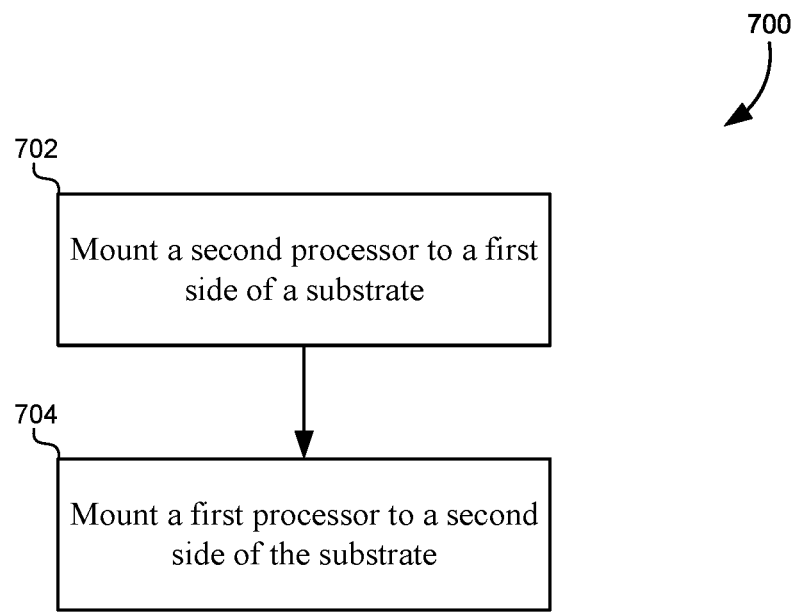
FIG. 7 illustrates a method for protecting communications between two processors, according to some embodiments.

FIG. 7 illustrates a method for protecting communications between two processors, according to some embodiments. The method may include mounting a second processor to a first side of a first substrate (702). The second processor may include a main processor configured to perform cryptographic operations using cryptographic keys. The method may also include mounting a first processor to a second side of the substrate (702). The first processor may include a cryptographic processor configured to generate cryptographic keys used by the cryptographic operations performed by the second processor. In some embodiments, the second processor may be mounted directly opposite or above the first processor. Traces between the second processor and the first processor through which the cryptographic keys are transmittable may be internal and thus run through an interior of the first substrate such that they are not exposed on an exterior of the first substrate. The second processor and/or the first processor may be mounted to the first substrate using pads or connection options that are beneath the second processor and/or the first processor. For example, these processors may use BGA connections that conceal the connections to the traces between the two processors such that they are not accessible without removing the processors. These processors may be mounted to the first substrate as depicted above in FIGS. 3A-3C. The additional features described above (e.g., the second substrate, the cavity, the third substrate, integrated IVRs in the cavity, EMI shielding, etc.) may also be optionally included but are not required.

It should be appreciated that the specific steps illustrated in FIG. 7 provide particular methods of protecting communications between two processors according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

What is claimed is:

1. A circuit assembly comprising:
a first substrate comprising a first side and a second side opposite of the second side;
a first processor mounted on the second side of the first substrate, wherein the first processor is configurable to generate cryptographic keys used by a cryptographic operations;
a second processor mounted on the first side of the first substrate opposite of the first processor, wherein the second processor is configurable to perform the cryptographic operations; and
wherein the first substrate comprises traces through an interior of the first substrate between the first processor and the second processor through which the cryptographic keys are transmittable from the first processor to the second processor.

2. The circuit assembly of claim 1, wherein the traces through the interior of the first substrate are not exposed on the first side or the second side of the first substrate when the first processor and the second processor are mounted on the first substrate.

3. The circuit assembly of claim 1, wherein the first processor is mounted to the first substrate using a ball grid array (BGA) surface-mount packaging.

4. The circuit assembly of claim 1, further comprising a voltage converter mounted on the second side of the first substrate, wherein the voltage converter provides a regulated voltage to the first processor.

5. The circuit assembly of claim 1, further comprising a memory chip mounted on the first side of the first substrate, wherein the first processor is configured to perform the cryptographic operations using the cryptographic keys on data that is stored in the memory chip.

6. The circuit assembly of claim 1, further comprising a layer of metal shielding that is sputtered onto the first side of the first substrate to cover the first processor with the layer of metal shielding.

7. The circuit assembly of claim 6, further comprising a heatsink that is mounted on the first processor such that the layer of metal shielding is between the first processor and the heatsink.

8. A circuit assembly comprising:
a first substrate comprising a first side and a second side opposite of the first side;
a second substrate comprising a first side and a second side opposite of the first side, wherein the first side of the second substrate is mounted to the second side of the first substrate, and the second substrate comprises a cavity;
a first processor that is configurable to generate cryptographic keys; wherein the first processor is mounted to the second side of the first substrate inside of the cavity of the second substrate; and
a second processor mounted to the first side of the first substrate, wherein the second processor is configurable to receive the cryptographic keys from the first processor and perform cryptographic operations.

9. The circuit assembly of claim 8, further comprising a third substrate that is mounted to the second side of the second substrate such that the first substrate and the third substrate enclose the first processor within the cavity of the second substrate.

10. The circuit assembly of claim 8, wherein the first substrate comprises a higher density interconnect than the second substrate.

11. The circuit assembly of claim 8, further comprising a voltage converter that is mounted to the second side of the first substrate with the first processor inside of the cavity of the second substrate.

12. The circuit assembly of claim 11, wherein the voltage converter comprises an integrated converter and inductor in an integrated circuit package.

13. The circuit assembly of claim 12, wherein the integrated converter generates electromagnetic noise within the cavity of the second substrate.

14. The circuit assembly of claim 8, wherein the first substrate is mounted to the second substrate using a ball grid array (BGA).

15. The circuit assembly of claim 14, wherein pads in the BGA prevent a linear access to the cavity between the first substrate and the second substrate.

16. A method of assembling a circuit assembly, the method comprising:
mounting a first substrate comprising a first side and a second side opposite of the first side to a second substrate comprising a first side and a second side opposite of the first side, wherein the first side of the second substrate is mounted to the second side of the first substrate, and the second substrate comprises a cavity;
mounting a first processor to the second side of the first substrate inside of the cavity of the second substrate; and
mounting a second processor to the first side of the first substrate, wherein the first processor is connected to the second processor through traces that are inaccessible without removing the second processor.

17. The method of claim 16, further comprising sputtering an electromagnetic shield on the second processor and at least a portion of the first side of the first substrate.

18. The method of claim 17, wherein the electromagnetic shield comprises an adhesive layer, a metal layer, and a conformal coating.

* * * * *